Dec. 12, 1961   E. L. KELLEY ET AL   3,012,496
ROTARY GRILL
Filed Oct. 2, 1959   2 Sheets-Sheet 2

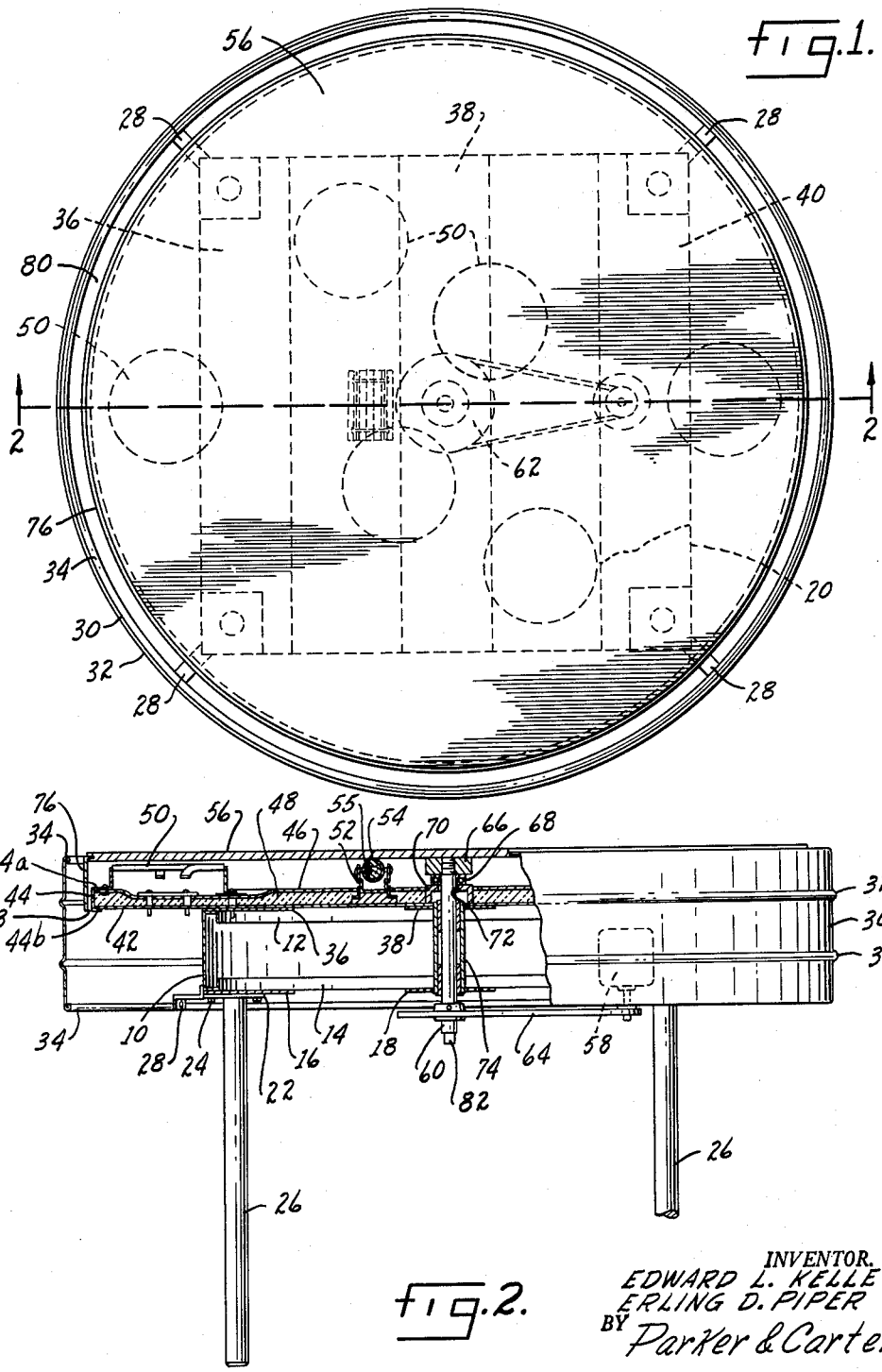

INVENTORS.
EDWARD L. KELLEY
ERLING D. PIPER
BY Parker & Carter
Attorneys.

3,012,496
ROTARY GRILL
Edward L. Kelley, 1520 Greenwood Ave., and Erling D.
Piper, 2006 Ridge Ave., both of Rockford, Ill.
Filed Oct. 2, 1959, Ser. No. 844,120
2 Claims. (Cl. 99—423)

This invention relates to a large capacity timed rotary grill.

One purpose of this invention is a rotary grill having improved means for controlling the temperature of the cooking surface.

Another purpose is a rotary grill having a large capacity and so suitable for use in large institutions or at large gatherings.

Another purpose is a rotary grill utilizing improved heat retaining means for maintaining a generally constant grill temperature.

Another purpose is a simple and inexpensive rotary grill having a large capacity.

Another purpose is a rotary grill utilizing improved heat reflecting means in the heating of the cooking surface.

Another purpose is an improved temperature sensing means for use on a rotary grill.

Other purposes will appear in the ensuing specification, drawings and claims.

The invention is illustrated diagrammatically in the following drawings wherein:

FIGURE 1 is a top plan view of our rotary grill.

FIGURE 2 is a section along line 2—2 of FIGURE 1.

Figure 3:
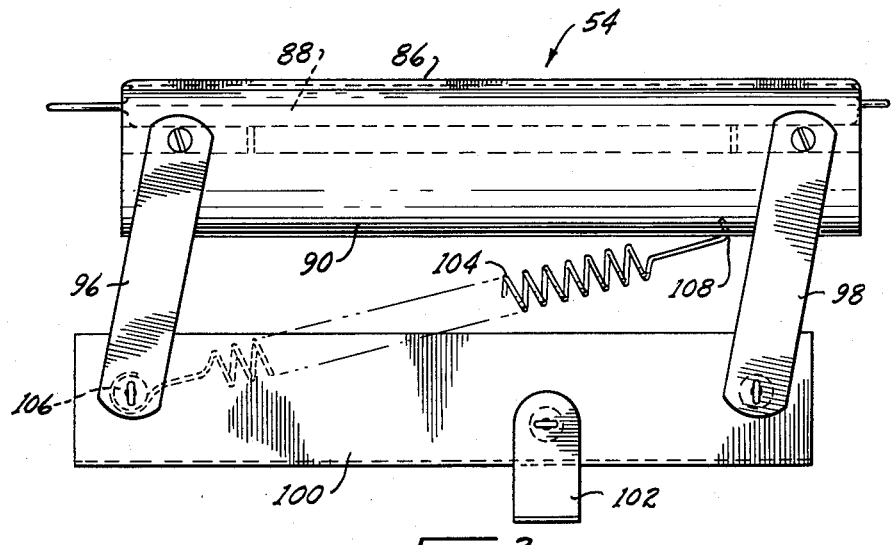
FIGURE 3 is an enlarged side elevation of the temperature sensing means.

The rotary grill shown and described herein has a support structure including a generally square support member 10 having an upper flange 12 and a lower flange 14. Three generally rectangular base plates 16, 18 and 20 are positioned on opposite sides and in the middle of the support member 10. There is a mounting plate 22, suitably secured to the outer base plates by means of bolts or screws or studs 24 at each corner of the support structure. The plates 22 may be suitably welded or may be integral with the legs 26, positioned at each corner of the support structure. Whereas we have shown a square support structure, this is not intended as a limitation and is not essential to the invention. Any type of support structure is satisfactory.

As clearly seen in FIGURE 1, there are four brackets 28 extending outwardly from the four corners of the support structure. These brackets support an outer cylindrical wall 30 which forms the outer structure of our improved rotary grill. The cylinder 30, which may be stainless steel, may have a plurality, in this case two, circumferential beads 32 which provide additional strength for the cylinder. The top and bottom edges of the cylinder 30 have been rolled over, as at 34, to provide smooth edges at both the top and bottom of the structure.

Suitably fastened to the upper flange 12 of the support members 10, are three upper support plates 36, 38 and 40. The upper support plates are of the same size and shape as the base plates 16, 18 and 20 and are generally aligned therewith. A generally circular lower plate 42, which forms the lower surface for the insulating structure, is suitably secured to the upper support plates. The upper surface of our insulating structure may be formed of a thin heat reflecting foil or similar reflective material. We prefer to have the foil of a thickness such that it will wrinkle. This not only provides a better reflective surface but additionally maintains the burners in their proper position. If the material will not wrinkle the heat from the burners will expand the member 46 and cause misalignment of the burners. If however, the foil 46 will wrinkle, when heat is applied and the foil expands, the expansion is taken up by the wrinkling effect. The foil or member 46 and the plate 42 define an insulating area 48. This insulating area may contain rockwool insulation or any other suitable type of insulating material. The insulating area or layer is completed by a circumferential wall 44 having upper and lower flange portions 44a and 44b which are suitably secured to members 42 and 46.

A plurality of burners 50, which preferably are electric, are equally spaced circumferentially beneath the hot plate. As shown in the drawings, there are six burners, however, there may be more or less depending upon the size of the grill.

Although the burners are preferably generally circumferentially equally spaced, the radial spacing is not equal. As shown in FIGURE 1, the burners are spaced different radial distances from the center of the hot plate. The radial spacing is such that there is a generally uniform temperature over the surface of the hot plate. We do not intend to be limited to the placement of burners shown in FIGURE 1, as that is illustrative of only one configuration that will provide the necessary and critical even temperature distribution.

A suitable temperature sensing assembly 52 having a generally rectangular temperature sensitive member 54, is positioned adjacent the center of the grill. Preferably the member 54 is positioned to contact the hot plate as it rotates. The member 54 is surrounded by insulation 55 except for the area in contact with the hot plate. The temperature of the hot plate then regulates the burners and not the temperature of the surrounding area. The temperature sensing assembly or thermostat operates to control the burners so that a generally constant temperature is maintained over the surface of the hot plate. For example, when cooking pancakes we have found it suitable to have a temperature of approximately 425 degrees F. In the preferred form, the temperature differentials or the temperature difference between the hottest and coolest portions of the hot plate should not exceed 10 degrees F. There should be approximately a 10 degree temperature differential from the center of the plate to any point on the outer edge. If the temperature differential exceeds this range the food will not be properly cooked as the food on some areas may be burned and at other areas it may not be fully cooked.

Suitably supported for independent rotation above the burners is a hot plate 56, which in the preferred form has a chrome plated upper cooking surface. The hot plate is rotated by a motor 58, suitably secured to the support structure, which drives a central shaft 60 through a pulley 62 fastened to the shaft 60, and a belt or the like 64. The shaft 60 is threadedly engaged with a block 66, which may be welded to the lower surface of the hot plate. The support structure for the shaft is completed by a bearing 68 placed directly underneath block 66, a second block 70 having an aperture 72 to receive the shaft, and a suitable sleeve arrangement 74 within which the shaft rotates. The lower end of shaft 60 may be squared, as at 82, so that it may be held with a wrench or the like when the grill is turned off, for servicing the burners and sensing element.

A circumferential wall 76 is secured at its upper end to the hot plate 56 and extends down to a point generally adjacent the lower plate 42 so as to circumferentially mask both the burners and the layer of insulation. The wall 76 cooperates with wall 44 to define a small circumferential passage 78. In the operation of our device the heat generated by the burners is retained in the area or chamber between the hot plate and the surface 46 by means of the layer of insulation, the reflective surface 46 and the circumferential wall or heat seal 76.

It should be noted that there is a gap or space 80 between the wall 76 and the outer cylinder 30. When operating a large grill it is usually necessary for the cook to periodically scrape the cooking surface. In our invention refuse on the hot plate may be scraped into the gap 80. Although not shown in the drawings, a trough may be positioned underneath this gap to catch the refuse if desired.

Figure 4:
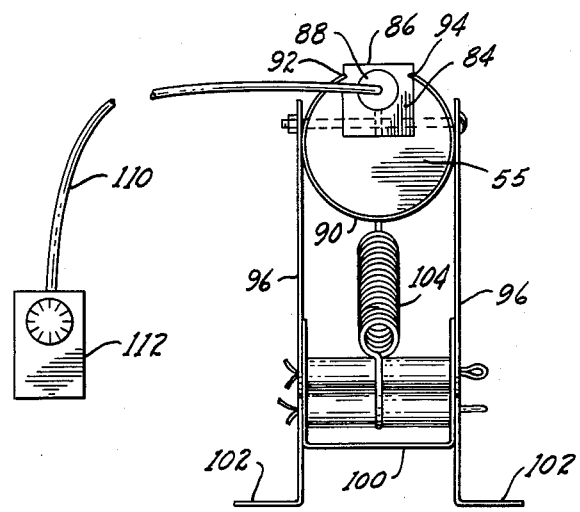
FIGURE 4 is an end view of the temperature sensing means of FIGURE 3.

FIGURES 3 and 4 show the details of the temperature sensing means 54. A generally rectangular metal shoe 84, which in the preferred form may be formed of brass, has a generally flat upper surface 86 which is adapted to contact the hot plate. During operation of the grill, the hot plate will continuously be in contact with shoe 84. Embedded within the shoe is a temperature sensitive element, which as clearly shown in FIGURE 4, is completely out of contact with the hot plate.

In order that the temperature of the plate itself control the burners, and not the temperature of the air in the heat chamber, we have enclosed the shoe 84, except for the surface 86, with insulation 55. The shoe is embedded within the insulation and the insulation and shoe in turn are enclosed in a cylinder 90 which contacts the shoe along longitudinal grooves 92 and 94 to support the shoe in the insulation. The cylinder 90 is supported by two pairs of brackets 96 and 98 pivotly secured at their upper ends to the cylinder and at their lower ends to a U-shaped member 100. The member 100 in turn is pivotly mounted on angle brackets 102 which supports the temperature sensing means in the grill structure. In order to insure contact between the upper surface 86 of the shoe and the hot plate we have connected a spring 104 to the cylinder 90, as at 108, and to pivot point 106, which connects bracket 96 to member 100. As can clearly be seen in FIGURE 4 this spring will bias the shoe against the hot plate.

The sensing element 88 which may be a thermocouple, fill bulb, or resistance thermometer, is connected by a suitable connecting means 110 to control apparatus 112 which regulates the operation of the burners.

The use, operation and function of our invention are as follows:

We have shown and described herein a rotary grill particularly suitable for use in feeding large groups, or large institutions, such as prisons, or army camps. As an example of the size of our grill structure, although we do not intend to be limited by these dimensions, the hot plate may be 48 inches in diameter and may be driven at a rate whereby a complete revolution of the plate takes place every three minutes and nine seconds. When so driven, the grill has a capacity of 1,000 five-inch pancakes per hour. Each cake cooks in two minutes and forty-five seconds, and fifty-five pancakes may be placed on the plate surface at one time. One cook may stand at a point on the circumference of the grill and apply the batter and another cook may stand halfway around the grill and turn the cakes over. When the cakes arrive around somewhere near the first cook they are completely cooked and may be taken from the grill. Although we have illustrated the operation of this grill as used in the cooking of pancakes, it should be obvious that the grill may be used for many other purposes, for example, hamburgers, toasted sandwiches, eggs, etc. When used to cook different foods, the speed of rotation of the grill will be varied so that the food may be completely cooked in one revolution of the grill. In cooking large quantities of food it is important that the food be cooked in a wholesome efficient and speedy manner. We have provided such a device which properly cooks the food in one revolution of the grill.

Of particular note in our invention is the improved means for retaining the surface of the hot plate at a regulated temperature. The temperature sensing means controls the operation of the burners. Heat retaining means including the layer of insulation, the heat reflective surface 46 and the heat seal or circumferential wall 76 provide a means for retaining the proper amount of heat within the space beneath the hot plate. The circumferential passage 78 permits only a small amount of heat to escape. The wall 76 stops the heated air from escaping out of the chamber formed by the hot plate and the surface 46. The thermostat or temperature sensing means and the placement of the burners controls the temperature of the hot plate so that there is a generally equal temperature across the cooking surface. The temperature differential should not exceed approximately 10 degrees F.

Another important feature of our invention is the support structure, the bottom of which is open to the ambient air between the base plates so as to provide a cooling affect. The ambient air can circulate beneath the heated structure and dissipate some of the heat to the surrounding area.

The construction of the temperature sensing means is important. The sensing element is embedded within the shoe and is out of contact with the plate surface. The shoe, which is formed of brass or some other good heat conductor, is in contact with the hot plate and is insulated from the surrounding air. The temperature of the sensing element, which controls the operation of the burners, is regulated by the temperature of the hot plate.

Whereas we have shown and described the preferred form of the invention, it should be realized that there are many modifications, substitutions and alterations thereto within the scope of the following claims.

We claim:

1. In an open top rotary grill, a generally circular rotatable hot plate having a cooking surface that is continuous from the center out to the periphery, a support structure for said grill, means for rotating said hot plate relative to said support structure, means for heating said hot plate including a plurality of electric burners beneath the hot plate and staggered circumferentially and radially from the center of the plate out to the periphery in a manner to generally uniformly heat the hot plate, heat retaining means for said hot plate including a layer of insulation positioned beneath said burners and extending over an area generally equal to said hot plate, a heat reflective foil covering said layer of insulation and extending over an area generally equal to said hot plate, said foil being attached to said support structure and said burners being mounted on top of said foil, said reflective foil and said hot plate defining a heat chamber, a circumferential wall secured to and extending downwardly from said hot plate, said wall circumferentially masking said heat chamber to retain the heat therein.

2. The structure of claim 1 further characterized by temperature sensing means for controlling said burners including a metal shoe positioned beneath said plate and having an upper surface in contact therewith, a temperature sensitive element embedded within said shoe and out of contact with said plate, a layer of insulation enclosing said shoe and insulating it from the surrounding area, and a spring attached to said shoe and to the support structure for biasing said shoe into contact with said hot plate at all times.

References Cited in the file of this patent

UNITED STATES PATENTS

| | | |
|---|---|---|
| Re. 19,685 | Brand | Sept. 3, 1935 |
| 1,599,556 | Cook | Sept. 14, 1926 |
| 1,717,849 | Maynard | June 18, 1929 |
| 1,984,782 | Brand | Dec. 18, 1934 |
| 2,033,178 | Brand | Mar. 10, 1936 |
| 2,168,773 | Parr | Aug. 8, 1939 |
| 2,525,850 | Anderson | Oct. 17, 1950 |
| 2,918,051 | Broman | Dec. 22, 1959 |

OTHER REFERENCES

German application Ser. No. Z3742, printed June 28, 1956 (Kl. 42 i, Group 11 04).